(12) United States Patent
Huelke et al.

(10) Patent No.: US 9,931,991 B2
(45) Date of Patent: Apr. 3, 2018

(54) ROTATING GARMENT HOOK

(71) Applicant: Ford Global Technologies, LLC, Dearborn, MI (US)

(72) Inventors: David Huelke, Milan, MI (US); Eric Axel Smitterberg, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 14/872,500

(22) Filed: Oct. 1, 2015

(65) Prior Publication Data

US 2016/0023611 A1    Jan. 28, 2016

Related U.S. Application Data

(63) Continuation of application No. 14/086,442, filed on Nov. 21, 2013.

(51) Int. Cl.
| | |
|---|---|
| *B60R 7/04* | (2006.01) |
| *B60R 7/10* | (2006.01) |
| *B60Q 3/82* | (2017.01) |
| *B60Q 3/74* | (2017.01) |
| *B60Q 3/68* | (2017.01) |
| *B60Q 3/20* | (2017.01) |
| *B60Q 3/44* | (2017.01) |
| *B60Q 3/57* | (2017.01) |
| *B60Q 3/80* | (2017.01) |

(52) U.S. Cl.
CPC ............. *B60R 7/10* (2013.01); *B60Q 3/20* (2017.02); *B60Q 3/44* (2017.02); *B60Q 3/57* (2017.02); *B60Q 3/68* (2017.02); *B60Q 3/74* (2017.02); *B60Q 3/80* (2017.02); *B60Q 3/82* (2017.02)

(58) Field of Classification Search
CPC .................... F21V 21/30; F21S 8/028
See application file for complete search history.

(56) References Cited

U.S. PATENT DOCUMENTS

| | | |
|---|---|---|
| 2,390,257 A * | 12/1945 | Jahn ................ A47G 25/065 248/294.1 |
| 2,486,859 A | 11/1949 | Meijer et al. |
| 4,686,609 A | 8/1987 | Dykstra et al. |
| 5,053,930 A | 10/1991 | Benavides |
| 5,366,127 A | 11/1994 | Heinz |
| 5,434,013 A | 7/1995 | Fernandez |
| 5,709,453 A | 1/1998 | Krent et al. |
| 5,839,718 A | 11/1998 | Hase et al. |
| 6,031,511 A | 2/2000 | DeLuca et al. |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Anh Mai
*Assistant Examiner* — Zachary J Snyder
(74) *Attorney, Agent, or Firm* — Vichit Chea; Price Heneveld LLP

(57) ABSTRACT

A multi-purpose assembly for a vehicle is disclosed. The assembly comprises a rotational assembly comprising a first surface rotationally interchangeable with a second surface. The assembly further comprises a housing configured to pivotally engage the rotational assembly. The first surface comprises a hanger and the second surface comprises a task light.

20 Claims, 5 Drawing Sheets

(56) References Cited

U.S. PATENT DOCUMENTS

| | | |
|---|---|---|
| 6,095,469 A | 8/2000 | Von Alman |
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,827,516 B2 | 9/2014 | Stakoe et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,568,659 B2 | 2/2017 | Verger et al. |
| 9,604,579 B2 | 3/2017 | Huelke |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0036304 A1* | 2/2004 | Thompson ............ B60N 3/023 296/1.02 |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0247861 A1* | 10/2007 | Tiesler ............... B60R 11/00 362/488 |
| 2007/0285938 A1 | 12/2007 | Palmer et al. |
| 2007/0297045 A1 | 12/2007 | Sakai et al. |
| 2008/0239709 A1* | 10/2008 | Rapeanu ............. F21S 8/024 362/147 |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1* | 4/2010 | Hessling ............. F21K 9/00 315/192 |
| 2011/0012062 A1 | 1/2011 | Agrawal et al. |
| 2011/0222302 A1 | 9/2011 | Hodgson et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2007081997 A2 | 7/2007 |
| WO | 2014068440 A1 | 5/2014 |
| WO | 2014161927 A1 | 10/2014 |

* cited by examiner

US 9,931,991 B2

ROTATING GARMENT HOOK

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related application is hereby incorporated by reference in its entirety.

FIELD OF THE INVENTION

The present disclosure generally relates to a vehicle assembly and more specifically relates to an interior vehicle assembly comprising a hanger.

BACKGROUND OF THE INVENTION

Conventional vehicle hangers have traditionally been implemented in vehicles providing limited functionality. However, hangers may be implemented in vehicles to provide various features to improve accessibility and provide additional utility.

SUMMARY OF THE INVENTION

According to one aspect of the present disclosure, a multi-purpose assembly for a vehicle is disclosed. The assembly comprises a rotational assembly comprising a first surface rotationally interchangeable with a second surface. The assembly further comprises a housing configured to pivotally engage the rotational assembly. The first surface comprises a hanger and the second surface comprises a task light.

According to another aspect of the present disclosure, a hanger assembly for a vehicle is disclosed. The assembly comprises a rotational assembly comprising a first surface rotationally interchangeable with a second surface. A hanger is disposed on the first surface. The rotational assembly is configured to engage a housing. At least one light source is disposed in the housing. The assembly comprises a proximity sensor configured to selectively activate the light source.

According to yet another aspect of the present disclosure, a hanger assembly for a vehicle is disclosed. The assembly comprises a rotational assembly having a first surface rotationally interchangeable with a second surface. A housing is configured to engage the rotational assembly and comprises a first light source disposed therein. The first light source is configured to generate ambient light to illuminate at least a portion of the rotational assembly. The hanger assembly further comprises a second light source disposed on the second surface corresponding to a task light. The first surface comprises a hanger configured to support garments and other hanging materials.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The terms first, second, third, etc. as utilized herein may provide designations in reference to the figures for clarity. For example, a first portion and a second portion may be referred to in some implementations and only a second portion may be referred to in some additional implementations. Such designations may serve to demonstrate exemplary arrangements and compositions and should not be considered to designate a specific number of elements or essential components of any specific implementation of the disclosure, unless clearly specified otherwise. These designations, therefore, should be considered to provide clarity in reference to various possible implementations of the disclosure, which may be combined in various combinations and/or individually utilized in order to clearly reference various elements of the disclosure.

Figure 1:
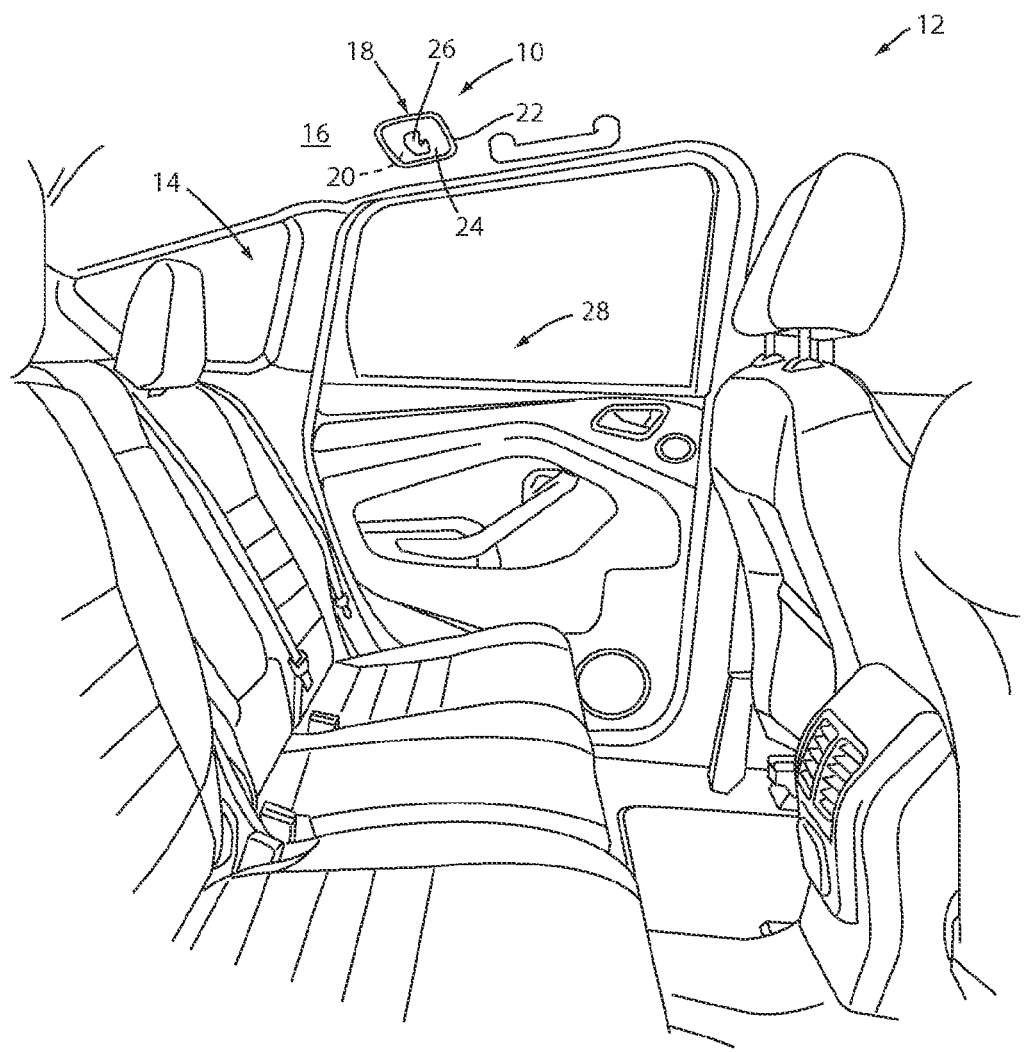
FIG. 1 is a perspective view of a passenger compartment of a vehicle demonstrating a hanger assembly.

The disclosure provides for a hanger assembly for a vehicle that may be operable to illuminate a portion of a vehicle. In some embodiments, the disclosure may provide for at least a portion of the hanger assembly to illuminate in response to an object in proximity to the assembly. Referring to FIG. 1, a hanger assembly 10 for a vehicle 12 is demonstrated in a projected view of a passenger compartment 14 of the vehicle 12. The hanger assembly 10 is shown disposed in a headliner portion 16 corresponding to an interior roof portion of the vehicle 12. The hanger assembly 10 may correspond to a rotational assembly having a first surface 18, which may be rotationally interchangeable with a second surface 20. As demonstrated in FIG. 1, the first surface 18 is shown demonstrating the hanger assembly 10 in a hanger configuration.

As further discussed herein, the hanger assembly 10 may pivotally engage a housing 22 such that a rotational assembly 24 may be rotated to selectively expose the first surface 18 or the second surface 20. The second surface 20 may provide for the hanger assembly 10 to provide for at least one additional function. In an exemplary embodiment, the additional function provided by the second surface 20 may correspond to a task light.

In the hanging configuration, the hanger assembly 10 may expose the first surface 18 to provide access to a hanger 26 in connection with the first surface 18. The hanger 26 may correspond to a garment hanger or a hanger for various items that may be placed in the vehicle 12. As illustrated in FIG. 1, the hanger assembly 10 is shown in a rear passenger compartment portion 28 of the vehicle 12. However, the hanger assembly 10 may be utilized in various portions of the passenger compartment 14 and may also be utilized in any interior portion of a vehicle 12.

Figure 2A:
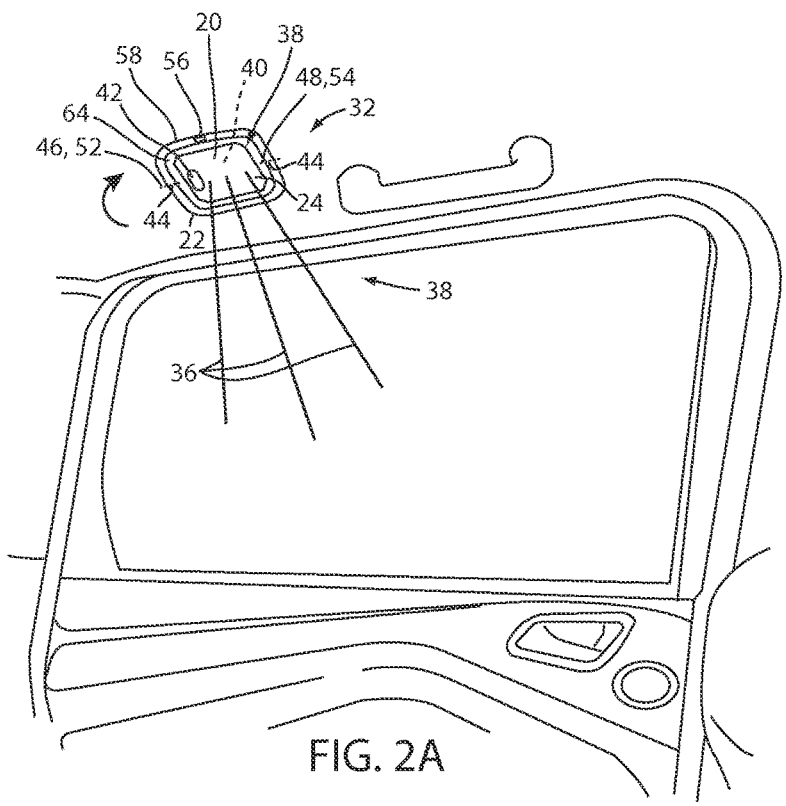
FIGS. 2A and 2B demonstrate a hanger assembly for a vehicle in a first configuration and a second configuration, respectively.
Figure 2B:
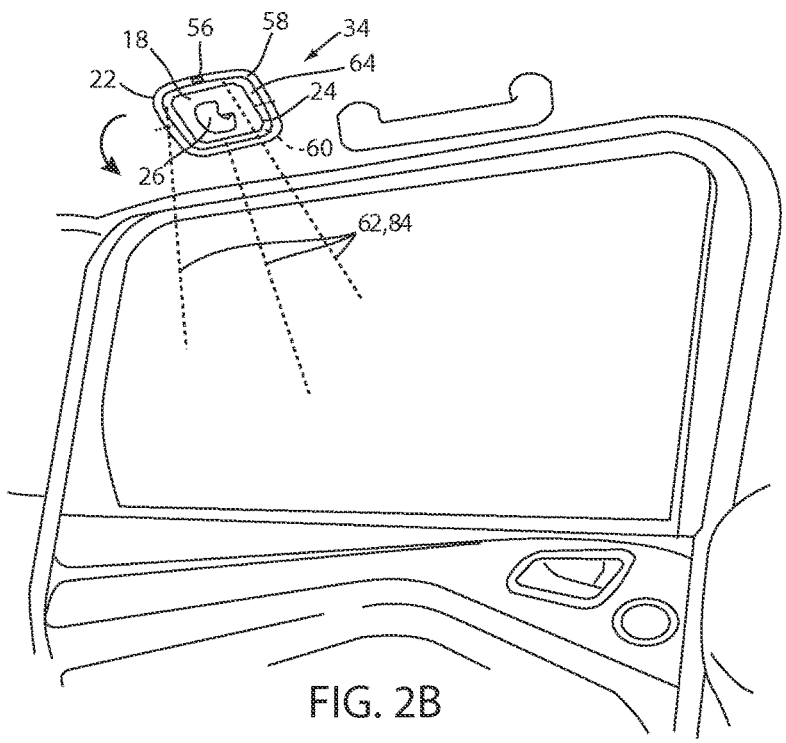

Referring to FIGS. 2A and 2B, the hanger assembly 10 is shown in a task light configuration 32 and a hanger configuration 34, respectively. In the task light configuration 32, the second surface 20 of the rotational assembly 24 may be exposed to the passenger compartment 14 of the vehicle 12. In this configuration, the hanger assembly 10 may provide for a first output emission 36 to be selectively projected into the passenger compartment 14 to provide a task light 38 or reading light.

The task light 38 may comprise at least one light source or a first light source 40 disposed on the second surface 20 of the rotational assembly 24. The first light source 40 may be in communication with a power source via a switch 42 configured to selectively activate the first output emission 36. Additionally, the task light 38 may be in communication with the power source via at least one electrical input port. The electrical input port may correspond to at least one pin 44, which may correspond to a pivot pin.

The pin 44 may be configured to pivotally connect the rotational assembly 24 to the housing 22 such that the rotational assembly may be selectively oriented to expose the first surface 18 or the second surface 20. The pin 44 may comprise a first end portion 46 and a second end portion 48. The first end portion 46 and the second end portion 48 may form a circuit configured to provide energy from the power source to the first light source 40. For example, the first end portion 46 may be configured to correspond to a first terminal 52, and the second end portion 48 may be configured to correspond to a second terminal 54. In this configuration, current may be provided from the power source to the first light source 40 via the pin 44 such that power transmission from the power source may be maintained while allowing the rotational assembly 24 to rotate about the pin 44.

Referring now to FIG. 2B, the hanger configuration 34 of the hanger assembly 10 is shown. In the hanger configuration 34, the first surface 18 of the rotational assembly 24 is exposed to the passenger compartment 14 such that the hanger 26 is accessible. In the task light configuration 32 and the hanger configuration 34, the hanger assembly 10 may further provide for an ambient lighting function, which may be selectively activated in response to a proximity detection of an object proximate the hanger assembly 10. The hanger assembly 10 may comprise a proximity sensor 56 configured to detect the presence of an object proximate the hanger assembly 10. The proximity sensor 56 may be disposed in a bezel 58 configured to form an intermediate surface between the rotational assembly 24 and the housing 22.

In an exemplary embodiment, the proximity sensor 56 may correspond to a capacitive sensor. In this configuration, the proximity sensor 56 may be configured to generate a proximity field proximate to the hanger assembly 10. The proximity sensor 56 may be configured to detect changes in the proximity field in response to an object, for example a hand of an occupant of the vehicle 12, being detected proximate to the proximity sensor 56. Though the proximity sensor 56 is discussed in reference to the capacitive sensor, it should be appreciated by those skilled in the art that other types of proximity sensors can be used in addition to or in an alternative to the capacitive sensor. For example, the proximity sensor 56 may correspond to inductive sensors, optical sensors, resistive sensors, temperature sensors, the like, or a combination thereof.

To provide for the ambient lighting function of the hanger assembly 10 in the hanger configuration 34, the hanger assembly 10 may further comprise a second light source 60 disposed in the housing 22. The second light source 60 is discussed in further detail in reference to FIG. 3B. The second light source 60 may be mounted to the housing 22 and in communication with the power source via a switch that may be controlled by the proximity sensor 56. The second light source 60 may be configured to emit ambient light 62 through an illuminated portion 64 of the rotational assembly 24. The illuminated portion 64 may correspond to an at least partially light transmission portion of the rotational assembly 24 configured to transmit the ambient light 62 from the second light source 60 disposed in the housing 22. In this configuration, the proximity sensor 56 may detect an object proximate the hanger assembly 10 and emit the ambient light 62 from the second light source 60 to provide for improved accessibility to the hanger 26 and the task light 38. The ambient light 62 may correspond to a second output emission 84 as discussed in reference to FIG. 3.

Figure 3A:
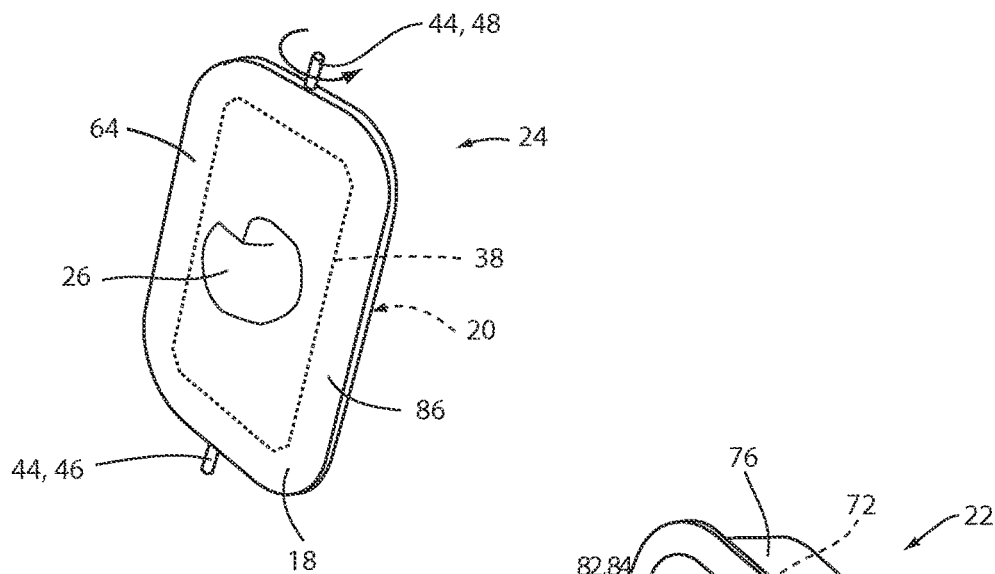
FIGS. 3A, 3B, and 3C are projected views of a hanger assembly demonstrating at least one subassembly.
Figure 3B:
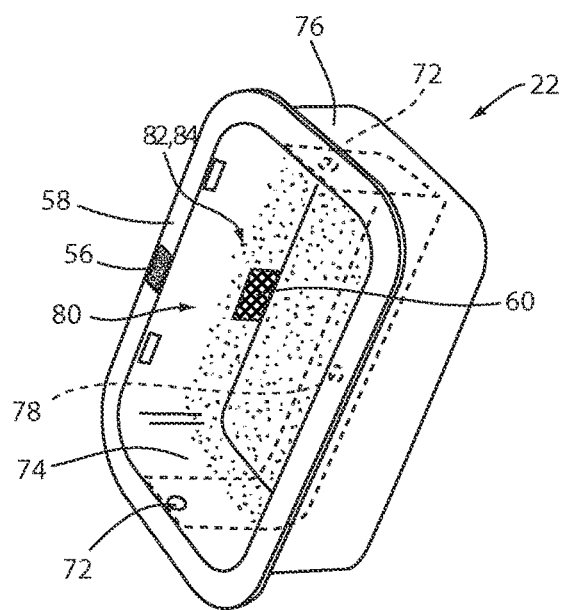
Figure 3C:
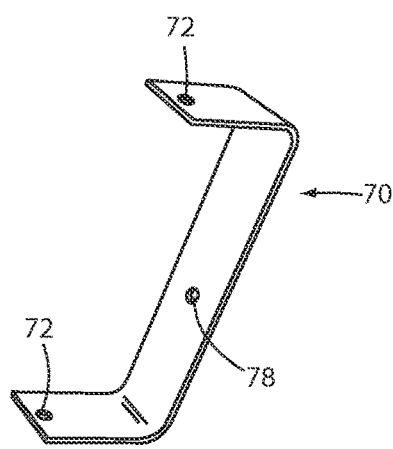

Referring now to FIGS. 3A, 3B, and 3C, an exploded view of the hanger assembly 10 is shown demonstrating the rotational assembly 24, the housing 22, and a reinforcement bracket 70, respectively. The rotational assembly 24 is shown demonstrating the first surface 18 including the hanger 26 connected thereto. The task light 38 is shown as a hidden line corresponding to the second surface 20. The first end portion 46 and the second end portion 48 of the pin 44 extend from the rotational assembly 24 and may be configured to align with a plurality of apertures 72 disposed in a first wall 74 and a second wall 76 of the housing 22. The first wall 74 and the second wall 76 may correspond to opposing surfaces configured to support and retain the pin 44 to provide for the rotational engagement of the rotational assembly 24 to the housing 22.

The rotational engagement of the rotational assembly 24 to the housing 22 may further be provided by the reinforcement bracket 70. Alternatively or in addition to the apertures 72 being disposed in the housing 22, the apertures 72 may be disposed in the reinforcement bracket 70. The reinforcement bracket 70 may further be interconnected with the housing 22 via at least one fastener or fastening device. The fastener may be disposed in a central mating feature 78 configured to interconnect the reinforcement bracket 70 with the housing 22. In this configuration, the reinforcement bracket 70 may provide for structural support for the housing to provide for heavy garments or other items to be hung from the hanger 26.

Referring now to FIG. 3B, the second light source 60 is shown disposed in a cup portion 80 formed by the housing 22. In an exemplary embodiment, the second light source 60 may be configured to emit an excitation emission configured to excite a photoluminescent portion 82 which may be disposed in the cup portion 80. In response to receiving the excitation emission from the second light source 60, the photoluminescent portion 82 may convert the excitation emission to a second output emission 84 which may correspond to the ambient light 62. At least one circuit may interconnect the proximity sensor 56 with the second light source 60 such that the second light source 60 may selectively emit the excitation emission to generate the second output emission 84.

The photoluminescent portion 82 may be disposed in the cup portion 80 as a coating or layer. In operation, the excitation emission may be emitted from the second light source 60 into the cup portion 80. The excitation emission may then be converted to one or more colors of ambient light. For example, the excitation emission may be emitted from the second light source 60 in a first wavelength. The first wavelength may correspond to at least one absorption wavelength of one or more photoluminescent materials disposed in the photoluminescent portion 82. The photoluminescent materials may convert the excitation emission at the first wavelength to the second output emission 84 having a second wavelength, different from the first wavelength. The second output emission 84 may comprise one or more wavelengths, one of which may be longer than the first wavelength. The conversion of the excitation emission to the second output emission 84 by the photoluminescent materials is referred to as a Stokes shift.

In some embodiments, the second output emission 84 may correspond to a plurality of wavelengths. Each of the plurality of wavelengths may correspond to significantly different spectral color ranges. For example, the at least second wavelength of the second output emission 84 may correspond to a plurality of wavelengths (e.g. second, third, etc.). In some implementations, the plurality of wavelengths may be combined in the second output emission 84 to appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue green emitting photoluminescent material having a wavelength of approximately 400-525 nm.

The photoluminescent materials corresponding to the photoluminescent portion 82 may comprise organic or inorganic fluorescent dyes configured to convert the excitation emission to the second output emission 84. For example, the photoluminescent portion 82 may comprise a photoluminescent structure of rylenes, xanthenes, porphyrins, phthalocyanines, or other materials suited to a particular Stokes shift defined by an absorption range and an emission fluorescence. In some embodiments, the photoluminescent portion 82 may be of at least one inorganic luminescent material selected from the group of phosphors. The inorganic luminescent material may more particularly be from the group of Ce-doped garnets, such as YAG:Ce. As such, each of the photoluminescent portions may be selectively activated by a wide range of wavelengths received from the excitation emission configured to excite one or more photoluminescent materials to emit an output emission having a desired color.

The photoluminescent portion 82 may be applied to a surface of the cup portion 80 and/or an at least partially light transmissive portion 86 of the rotational assembly 24. In this configuration, the second output emission 84 may be output from the first surface 18 or the second surface 20 to provide for the ambient light 62 to be output into the passenger compartment 14. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

The light sources as described herein (e.g. the first light source 40 and the second light source 60) may correspond to any form of light source or light generating device. For example, the light sources may correspond to one or more light generating devices such as halogen lights, fluorescent lights, light emitting diodes (LEDs), organic LEDs (OLEDs), polymer LEDs (PLEDs), solid state lighting or any other form of lighting. As such, the light sources of the hanger assembly 10 provide a variety of colors of light and lighting performance to suit a desired appearance or function.

As demonstrated in FIGS. 3A, 3B, and 3C, the hanger assembly 10 may provide for a flexible solution having multiple utilities. In the task light configuration 32, the first light source 40 may be selectively activated via the switch 42 to activate the task light 38. In the hanger configuration 34, the first surface 18 may be exposed to the passenger compartment 14 such that the hanger 26 is accessible to an occupant of the vehicle 12. Additionally, in both the task light configuration 32 and the hanger configuration 34, the proximity sensor 56 may selectively activate the second light source 60 to emit ambient light 62 through the light transmissive portion 86 of the rotational assembly 24. In this way, the hanger assembly 10 may provide for improved accessibility of the task light 38 and the hanger 26.

Figure 4A:
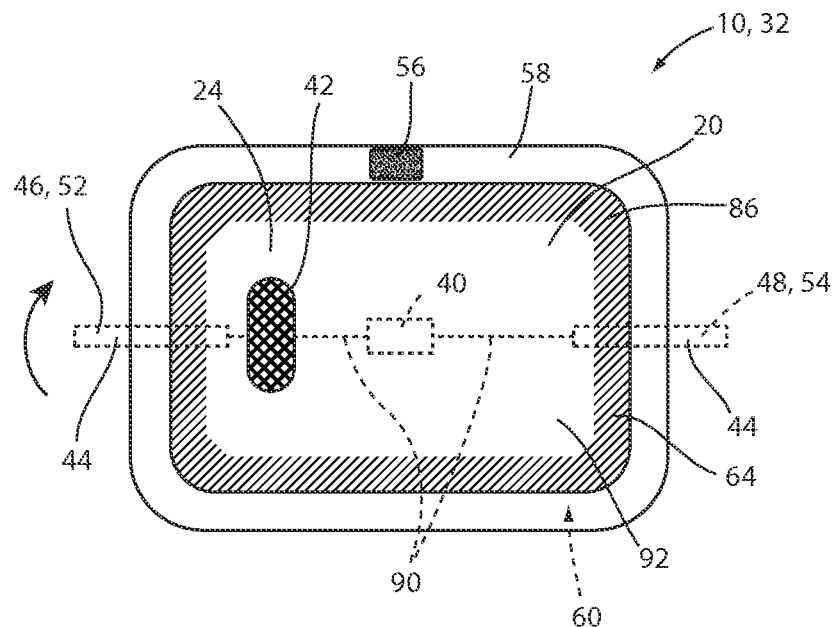
FIGS. 4A and 4B are front views of a hanger assembly demonstrating a task light configuration and a hanger configuration, respectively.
Figure 4B:
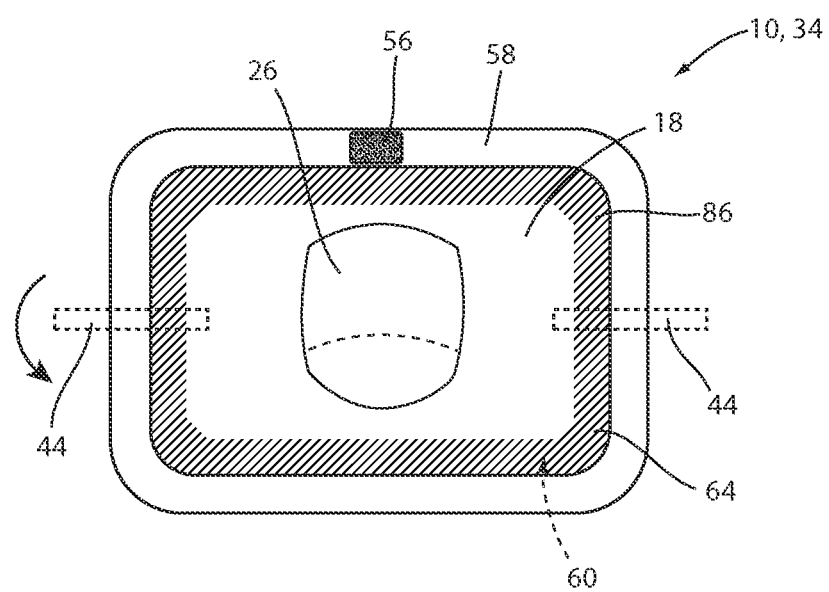

Referring now to FIGS. 4A and 4B, the hanger assembly 10 is shown in the task light configuration 32 and the hanger configuration 34, respectively. In the task light configuration 32, the rotational assembly 24 may be rotated such that the second surface 20 is directed to the passenger compartment 14 of the vehicle 12. The first light source 40 is shown disposed on the second surface 20 and in communication with a power source via a conductive connector 90. The conductive connector 90 may be configured to interconnect the first light source 40 with the switch 42, the first terminal 52 and the second terminal 54 such that current may be selectively provided to the first light source 40 via the switch 42. A diffusor and/or cover portion 92 may be disposed over the first light source 40 such that the task light 38 is protected and the first output emission 36 is projected through the cover portion 92 into the passenger compartment 14.

In the task light configuration 32, the proximity sensor 56 may selectively activate the second light source 60 in response to an object detected proximate thereto. In response to the selective activation by the proximity sensor 56, the second output emission 84 emitted from the photoluminescent portion 82 may be output via the light transmissive portion 86 of the rotational assembly 24. In this configuration, an occupant of the vehicle may easily identify a location of the hanger assembly 10 and the switch 42. The location may be readily identified by the occupant by moving an object, for example a hand, near the proximity sensor 56 such that the ambient light 62 is emitted through the light transmissive portion 86.

In the hanger configuration 34, the first surface 18 is exposed to the passenger compartment 14 of the vehicle 12. In this configuration, the hanger 26 may be readily accessible. As discussed in reference to the task light configuration 32, the accessibility of the hanger 26 may similarly be improved by the selective activation of the ambient light 62 in response to the detection of an object by the proximity sensor 56. As discussed herein, the hanger assembly 10 may provide for a multi-functional assembly to improve the accessibility of at least a hanger 26 disposed on the headliner portion 16 of the vehicle 12. The hanger assembly 10 may also provide for additional functionality such as the task light 38.

As demonstrated in FIGS. 4A and 4B, the hanger assembly 10 comprises the bezel 58 which is configured to retain the proximity sensor 56. In this configuration, the proximity sensor 56 is exposed and operable to detect an object in the passenger compartment 14 in both the task light configuration 32 and the hanger configuration 34. Though discussed in reference to the particular embodiments disclosed herein, the hanger assembly 10 may be configured according to multiple variants of the elements discussed herein without departing from the spirit of the disclosure.

Figure 5:
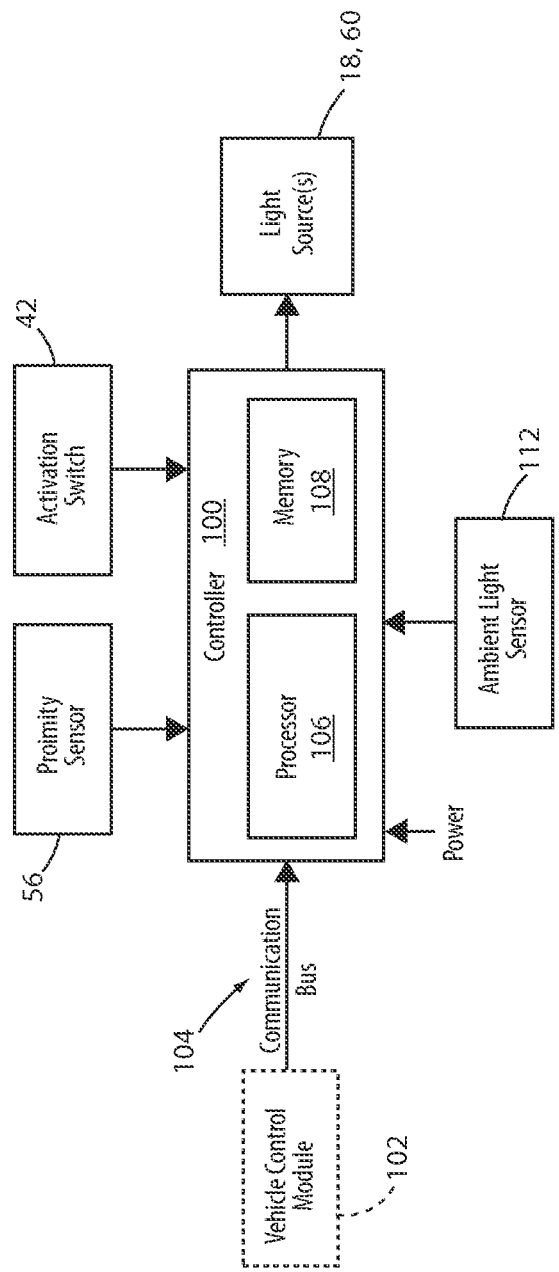
FIG. 5 is a block diagram of a controller configured to control at least one light source of the hanger assembly discussed herein.

Referring now to FIG. 5 a block diagram of a controller 100, which may be configured to control at least one of the first light source 40 and the second light source 60 is shown. As discussed herein, the first light source 40 may be activated in response to an input to the switch 42, which may further be in communication with the controller 100. Additionally, the controller 100 may be in communication with a vehicle control module 102 via a communication bus 104 of the vehicle 12. The communication bus 104 may be configured to deliver signals to the controller 100 identifying various vehicle states. For example, the communication bus 104 may be configured to communicate to the controller 100 a drive selection of the vehicle, a door open state, an ambient lighting level, a fuel level, or any other information or control signals that may be utilized to adjust the illumination of the first light source 40 and/or the second light source 60. In this way, the controller 100 may selectively activate the light sources in response to one or more states of the vehicle 12.

The controller 100 may include a processor 106 comprising one or more circuits configured to receive the signals from the communication bus 104 and output signals to control the light sources (e.g. 40 and 60) discussed herein. The processor 106 may be in communication with a memory 108 configured to store instructions to control the activation of the light sources. The controller 100 may further be in communication with an ambient light sensor 112. The ambient light sensor 112 may be operable to communicate a light condition, for example a level brightness or intensity of the ambient light proximate the vehicle 12. In response to the level of the ambient light, the controller 100 may be configured to adjust a light intensity output from the light sources 40 and/or 60. The intensity of the light output from the light sources 40 and 60 may be adjusted by controlling a duty cycle, current, or voltage supplied to the light sources 40 and 60.

The controller 100 may be configured to selectively activate and/or deactivate the light sources 40 and 60 in response to various vehicle states. Vehicle states may include but are not limited to: a drive selection of the vehicle 12, a door open state, an ambient lighting level, a fuel level, or any other information or control signals, for example a turn indication or a blind spot indication. In this configuration, the controller 100 may selectively activate the light sources 40 and 60 to illuminate at least a portion of the passenger compartment 14 in response to an environmental lighting, a moving or parked status, and various additional conditions that may relate to operation of the vehicle 12 and its environment. The controller 100 may further be configured to deactivate the light sources 40 and 60 in response to a change in the conditions that lead to the activation and/or in response to a lapse of a predetermined time.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A multi-purpose assembly for a vehicle comprising:
 a rotational assembly comprising a panel forming a transmissive portion and a first surface rotationally interchangeable with a second surface; and
 a housing forming an opening comprising a light source and configured to pivotally engage the rotational assembly, wherein the first surface comprises a hanger and the panel encloses the opening, wherein the transmissive portion transmits light from the light source through the panel.

2. The assembly according to claim 1, wherein the second surface comprises a task light and a switch configured to selectively activate the task light.

3. The assembly according to claim 2, wherein the rotational assembly is configured to be positioned in a first configuration wherein the hanger is exposed and the task light is substantially hidden in the housing.

4. The assembly according to claim 3, wherein the rotational assembly is further configured to be positioned in a second configuration wherein the task light is exposed and the hanger is substantially hidden in the housing.

5. The assembly according to claim 1, wherein the rotational assembly comprises at least one pivot pin interconnecting the rotational assembly to the housing.

6. The assembly according to claim 5, further comprising a reinforcement bracket in connection with the housing and the rotational assembly is configured to support a first side of the pivot pin and a second side of the pivot pin.

7. A hanger assembly for a vehicle comprising:
 a rotational assembly comprising a panel forming a first surface comprising a hanger rotationally interchangeable with a second surface, wherein the panel comprises a transmissive portion;
 a housing configured to engage the rotational assembly;
 a light source disposed in the housing, wherein the transmissive portion transmits light from the light source from the first surface to the second surface; and
 a proximity sensor configured to activate the light.

8. The hanger assembly according to claim 7, wherein the housing is configured to mount to an interior roof portion of the vehicle.

9. The hanger assembly according to claim 7, wherein the proximity sensor is configured to selectively illuminate the light source in response to a detection of a proximate object.

10. The hanger assembly according to claim 7, wherein the rotational assembly comprises an at least partially light transmissive portion configured to permit an output emission from the light source to pass therethrough.

11. The hanger assembly according to claim 10, wherein the light source is configured to emit an excitation emission as a substantially blue light.

12. The hanger assembly according to claim 11, further comprising a photoluminescent portion configured to convert the excitation emission to the output emission.

13. The hanger assembly according to claim 12, wherein the output emission corresponds to a different color of light than the first emission.

14. The hanger assembly according to claim 12, wherein the photoluminescent portion is disposed on the at least partially light transmissive portion.

15. A hanger assembly for a vehicle comprising,
a rotational assembly comprising a panel forming a transmissive portion comprising a first surface rotationally interchangeable with a second surface;
a housing configured to engage the rotational assembly;
a first light source disposed in the housing and configured to generate ambient light, wherein the ambient light is configured to illuminate the transmissive portion through the panel; and
a second light source disposed on the second surface corresponding to a task light, wherein the first surface comprises a hanger.

16. The hanger assembly according to claim 15, further comprising a proximity sensor configured to selectively activate the first light source in response to a detection of an object proximate the hanger assembly.

17. The hanger assembly according to claim 16, wherein the proximity sensor is configured to illuminate at least a portion of the first surface and the second surface in response to the detection.

18. The hanger assembly according to claim 15, further comprising a switch disposed on the second surface and configured to activate the second light source.

19. The assembly according to claim 1, wherein the transmissive portion extends around a perimeter of the panel.

20. The assembly according to claim 1, wherein the transmissive portion and the light source form an illuminated indicator illuminating a portion of the first surface proximate the hanger.

* * * * *

UNITED STATES PATENT AND TRADEMARK OFFICE
CERTIFICATE OF CORRECTION

PATENT NO. : 9,931,991 B2
APPLICATION NO. : 14/872500
DATED : April 3, 2018
INVENTOR(S) : Huelke et al.

It is certified that error appears in the above-identified patent and that said Letters Patent is hereby corrected as shown below:

In the Claims

Column 8, Claim 1, Line 27:
"the opening, wherein" should be --the opening and--.

Column 9, Claim 15, Line 13:
"comprising," should be --comprising:--.

Signed and Sealed this
Nineteenth Day of June, 2018

Andrei Iancu
*Director of the United States Patent and Trademark Office*